UNITED STATES PATENT OFFICE.

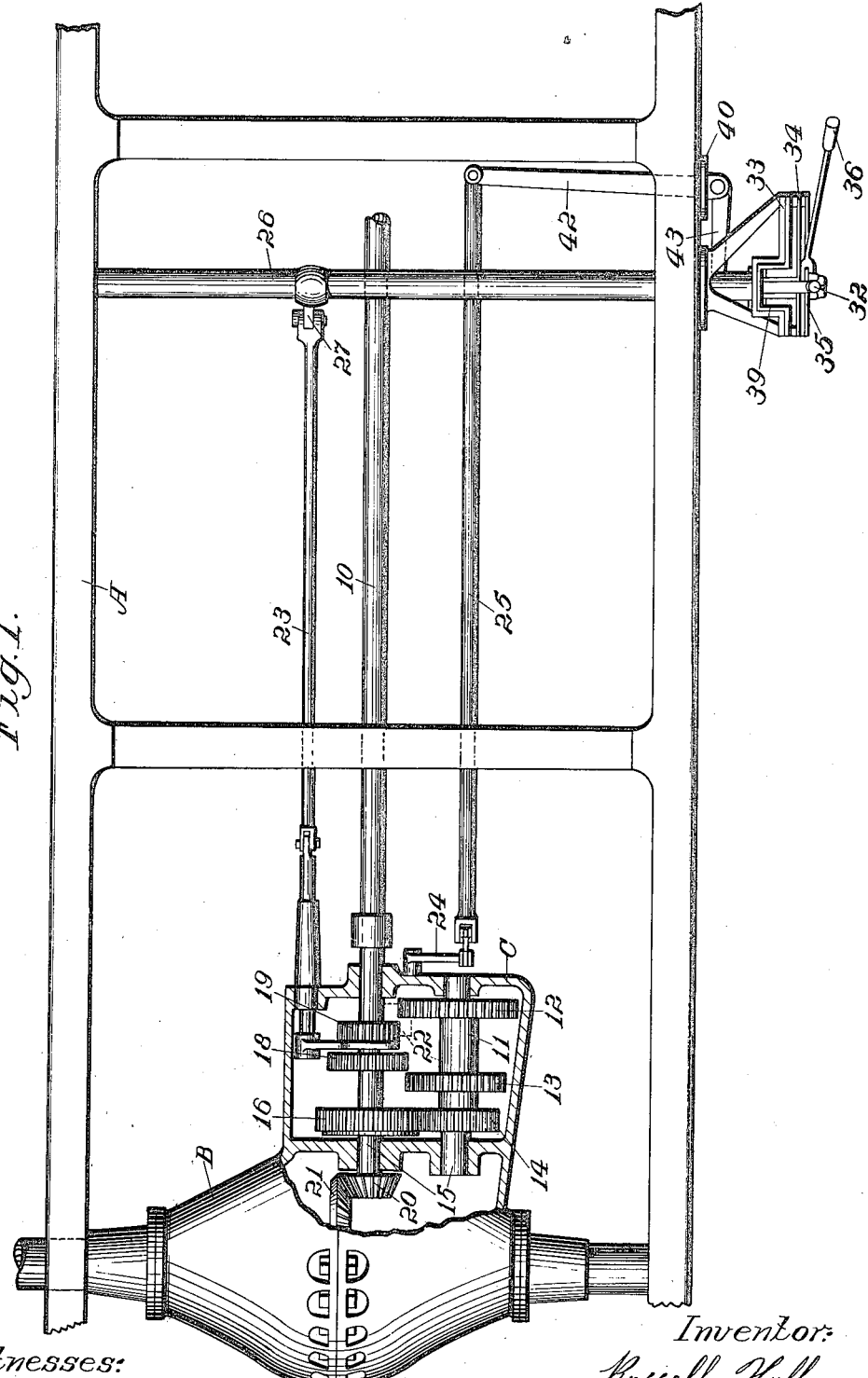

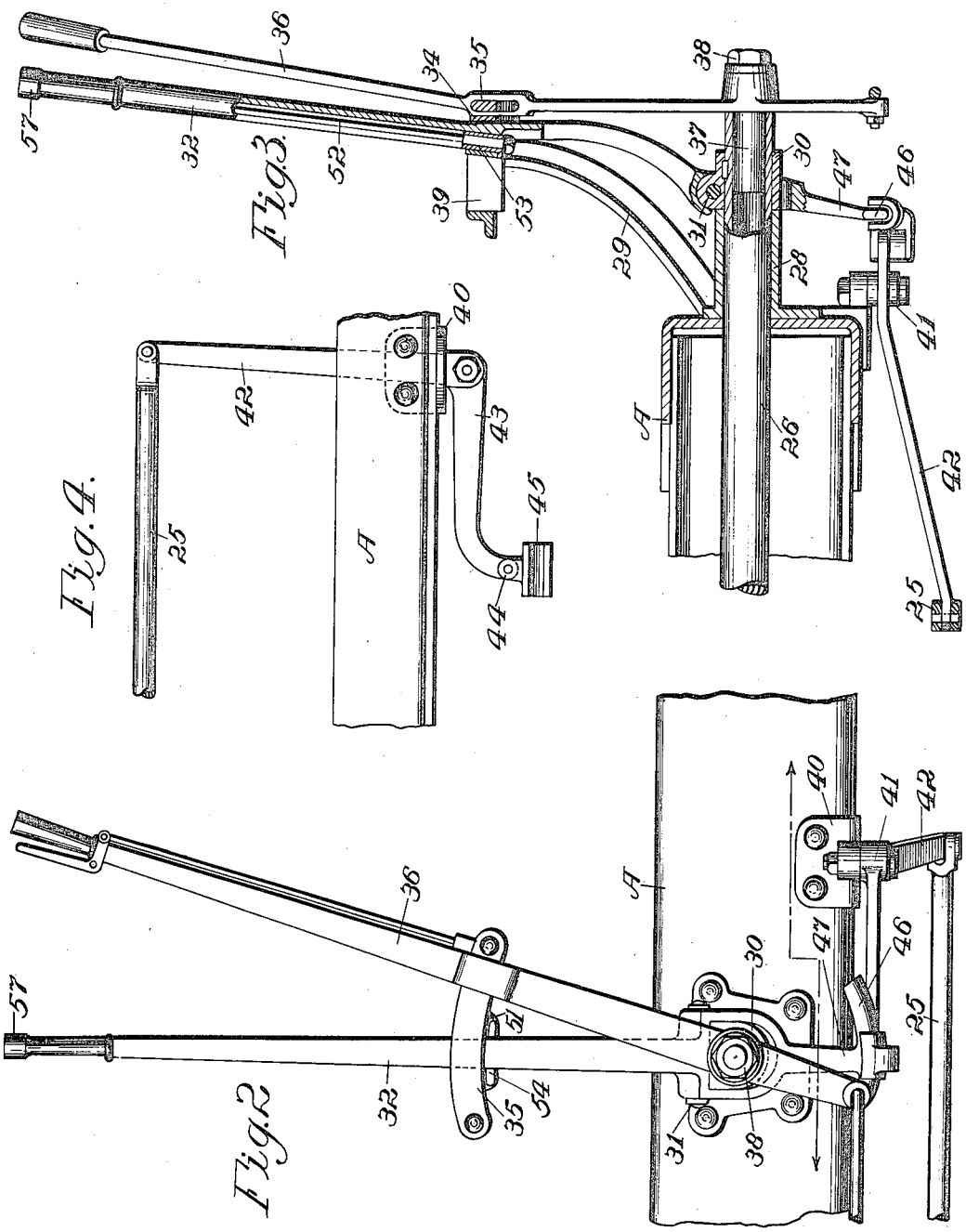

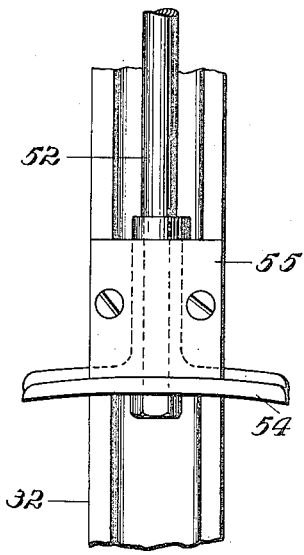
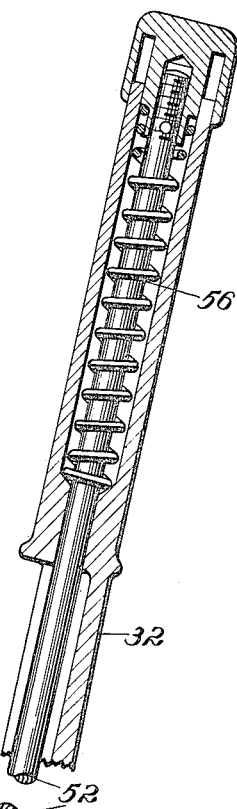
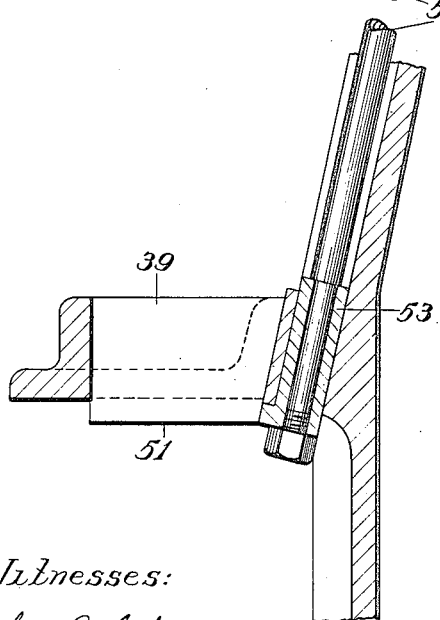
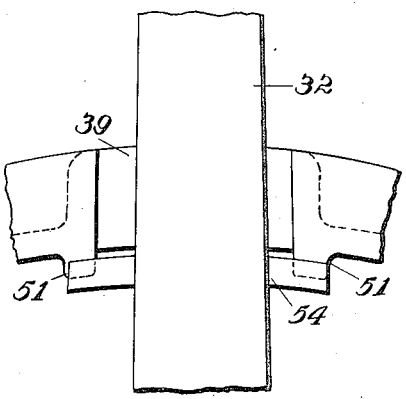

RUSSELL HUFF, OF DETROIT, MICHIGAN, ASSIGNOR, BY MESNE ASSIGNMENTS, TO PACKARD MOTOR CAR COMPANY, OF DETROIT, MICHIGAN, A CORPORATION OF MICHIGAN.

GEAR-SHIFTING MECHANISM.

1,293,783.  Specification of Letters Patent.  Patented Feb. 11, 1919.

Original application filed May 6, 1909, Serial No. 494,455. Divided and this application filed October 22, 1914. Serial No. 868,062.

*To all whom it may concern:*

Be it known that I, RUSSELL HUFF, a citizen of the United States, and resident of Detroit, Wayne county, State of Michigan, have invented certain new and useful Improvements in Gear-Shifting Mechanism, of which the following is a specification.

This application is a division of co-pending application Serial No. 494,455, filed May 6, 1909, and relates to gear-shifting mechanism, and in particular to gear-shifting mechanism of the type in which by the operation of a single lever the gears may be shifted to obtain three forward speeds and a reverse.

The objects of this invention are to improve the construction of the operating mechanism, to prevent movement of the operating lever to reversing position except when desired, and to improve the construction in general.

The hand-lever is connected to a shaft which is mounted in bearing lugs in the frame and the shaft is connected by proper link mechanism to the change speed mechanism to shift the gears to different positions. The hand-lever moves along a guide or sector back and forth for changes in forward speeds. The side of the guide or sector nearest the operator is provided with a recess in which the hand-lever is moved for reversing. A brake-lever is mounted on a stud on the end of the shaft and has a guide located outside of the hand-lever guide. By so mounting and constructing the hand and brake lever guides the hand-lever when moved to reversing position is moved away from the brake-lever and thus all interference between the two levers is prevented. In order to bring about such a construction the reverse gear must be connected to the hand-lever through a bell crank lever.

In the construction of a hand-lever guide of the above type in which the hand-lever moves into a recess in the guide when moved to reversing position, there is danger that it may be moved into the recess when not desired. Therefore this invention provides means for normally preventing transverse movement of the hand-lever into the recess to reversing position. This means consists of a bridging device connected to the hand-lever which is adapted to bridge the recess, and a button is provided on the hand-lever by the depression of which it may be thrown out of operative position and allow transverse movement of the lever.

In the drawings:

Figure 1 is a plan view of the vehicle frame showing the change speed and reverse gears and the hand-lever for operating the same;

Fig. 2 is a side elevation of the hand and brake levers and their guides;

Fig. 3 is a transverse section along the shaft;

Fig. 4 is a detail plan view of the bell-crank lever connection between the hand-lever and the reversing gear.

Fig. 5 is a section through the hand-lever and the guide;

Fig. 6 is a side elevation of the hand-lever showing the bridging device; and

Fig. 7 is an elevation of the other side of the lever showing the guide also.

Referring to the drawings, A designates the frame of the vehicle, B the axle and differential casing, and C the gear casing.

The main driving shaft 10 extends from the motor into the gear casing. A countershaft 11 has rigidly connected to it gears 12, 13 and 14. Upon a shaft 15 is mounted a gear 16 which meshes with gear 14. A sliding sleeve provided with gears 18, 19 is splined on the driving shaft 10 and is adapted to coöperate with gears 12, 13 and 16 to obtain the three speeds forward. Upon the shaft 15 is mounted a bevel pinion 20 which meshes with a bevel gear 21 on the differential housing. A wide gear 22 mounted upon a rock-shaft in the usual way is constructed to be thrown into mesh with gears 12 and 19 when in the position shown in Fig. 1 to obtain the reverse movement. Gear 22 is constructed to be thrown to operative and inoperative position by means of an arm 24 connected to a link 25. The sliding gears 18, 19 are operated by means of a fork connected to a link 23 which is attached to an arm 27 on the hollow shaft 26. The construction described so far is well-known.

The shaft 26 extends across the vehicle frame and is mounted in a bearing on the left side of the frame and extends through a bearing sleeve or lug 28 upon a bracket 29 which is secured to the vehicle frame. A sleeve 30 is rigidly connected to the shaft 26, which as shown is hollow, and upon this sleeve is pivoted at 31 the hand-lever 32. Integral with or otherwise secured to the bracket 29 is a side member 33, and spaced therefrom the side member 34, the members 33 and 34 forming the sector or guide for the hand-lever 32. A spaced member 35 is also secured to the bracket 29 and forms a guide for the brake-lever 36, which is mounted upon a stud 37 having its shank brazed in the hollow shaft 26. A nut 38 on the stud secures the brake-lever in place. The side member 33 is provided with a deep recess 39 into which the hand-lever 32 may be swung for a purpose to be hereafter described.

Upon the bracket 40 secured to the side member of the frame A is pivotally mounted a bell-crank lever 41 having one of its arms 42 pivotally connected to the link 25. The other arm 43 has pivotally mounted upon it a link member 44 provided with a slideway 45. A slide 46 in the form of an arc is attached to an extension 47 of the hand-lever 32. This slide coöperates with and slides within the slideway 45, as shown in Figs. 2 and 3.

In order to shift the gears for different speeds forward, the hand lever is moved back and forth between the guide members 33 and 34. The hand-lever being secured to the sleeve 30 by means of the pivot pin 31, which sleeve is rigidly connected to the shaft 26, transmits this back and forth movement to the shaft and through the arm 27 thereon to the link 23 and gears 18 and 19. During this movement the slide 46 will slide in its slideway 45 and no motion will be transmitted to the bell-crank lever 41. In order to throw into operation the reverse gear 22 the hand-lever 32 is moved opposite the recess 39 and moved inwardly away from the brake-lever. The hand-lever in this movement swings about pin 31 and through bell-crank lever 41 and link 25, and moves the reverse gear 22 into operative position. It will be seen that during this movement the sleeve 30 remains stationary and therefore no movement is transmitted to the shaft 26. The position of the lever in the guide before it moves into the recess 39, that is when it is in the position shown in Fig. 3, corresponds to the neutral position.

In the construction so far described there is danger that the hand-lever 32 will be moved into the recess 39 when not desired. Therefore in order to prevent such inadvertent movement there is provided a bridging device which normally prevents such movement of the hand-lever.

Referring to Figs. 5, 6 and 7, the side member 33 is provided with two lugs 51 located on opposite sides of the recess 39. A sliding rod 52 extends through the hand-lever and is provided with a sliding member 53 upon the lower end of which is mounted a bridge 54 which as shown in Fig. 7 is of sufficient width to bridge the recess 39. A retaining plate 55, attached to the hand-lever, permits the removal of the sliding member 53 and its bridge and also forms a stop member for a shoulder on the bridge 54. A spring 56 located within the hollow handle normally retains the shoulder and plate 55 in contact and the parts in the position shown in Fig. 5. A button 57 is mounted on the end of the rod 52 and so constructed that by the depression of the button the bridge 54 is moved below the lugs 51, allowing inward movement of the hand-lever into the recess 39 to reverse the vehicle.

It will therefore be seen that when the bridge is in operative position to bridge the lugs 51 as shown in Figs. 5 and 7, the hand-lever 32 may be moved back and forth along its guide, all danger of inadvertent movement into the recess 39 and to reversing position being avoided, but by a depression of bar 52 by pressure of the thumb on the button 57 the bridge can readily be thrown out of operative position and the lever to reversing position. When the lever is in reversing position, the spring 56 will yieldingly hold the bridge or latch 54 in engagement with the lower faces of the lugs 51. If now the lever is moved to neutral position, the bridge or latch will automatically snap over the lugs and lock the lever against reversing.

Although the bridging device is shown in the form of an elongated lug mounted upon the hand-lever, it will be evident that it is not absolutely necessary that this bridging device be mounted upon the hand-lever, nor need it have the specific construction shown, and it is to be understood therefore that this invention is not to be limited to the specific construction shown and described.

Having thus described my invention, what I claim and desire to secure by Letters Patent is:—

1. In transmission gearing for motor vehicles, the combination with change speed and reverse mechanisms, of a hand-lever for operating said mechanisms, means for pivoting said lever to swing backward and forward and inward, an arm on said lever extending beyond said pivot and operatively connected to said reverse mechanism, and means connecting said lever to said change speed mechanism, said connections to said lever being constructed to permit said lever to operate the change speed mechanism by a forward and backward movement and said reverse mechanism by an inward side movement.

2. In transmission gearing for motor vehicles, the combination with change speed and reverse mechanisms, of a transverse rock shaft connected with said change speed mechanism, a hand-lever on said shaft and adapted to operate the same by a backward and forward movement, means permitting transverse movement of said lever without moving said rock shaft, and means connecting said lever with said reverse mechanism, said parts being constructed to permit said lever to operate the change speed mechanism by a forward and backward movement and said reverse mechanism by a transverse movement.

3. In transmission gearing for motor vehicles, the combination with change speed and reverse mechanisms, of a transverse rock shaft connected with said change speed mechanism, a hand-lever pivoted on said rock shaft to swing inward and adapted to operate said rock shaft by a backward and forward movement, and an arm on said lever connected with the reverse mechanism, said connections to said lever being constructed to permit said lever to operate the change speed mechanism by a forward and backward movement and said reverse mechanism by a transverse movement.

4. In transmission gearing, the combination with reverse mechanism, of a hand-lever, a bell-crank lever having one of its arms connected to the reverse mechanism, and a connection between the other arm and the hand-lever comprising a link pivotally connected with the arm and slidingly connected with the hand-lever.

5. In transmission gearing, the combination with reverse mechanism, of a hand-lever, a support for supporting the hand-lever for pivotal movement thereon in two directions at right angles, a bell-crank lever pivotally supported by said support and having one of its arms connected to the reverse mechanism, and a connection between the other arm and the hand-lever comprising a link pivotally connected with the arm, and a slideway on the link coöperating with a slide on the hand-lever.

In testimony wherof I affix my signature in the presence of two witnesses.

RUSSELL HUFF.

Witnesses:
 LE ROI J. WILLIAMS,
 CLAIR J. COTE.